United States Patent [19]
Mizuta

[11] Patent Number: 5,682,286
[45] Date of Patent: Oct. 28, 1997

[54] MAGNETIC DISK CARTRIDGE PROVISIONALLY ASSEMBLED UTILIZING AT LEAST ONE RIVET

[75] Inventor: Akira Mizuta, Kanagawa-ken, Japan

[73] Assignees: Fuji Photo Film Co., Ltd., Tokyo, Japan; Tomega Corporation, Roy, Utah

[21] Appl. No.: 697,795

[22] Filed: Aug. 30, 1996

[51] Int. Cl.⁶ .............................. G11B 23/03; F16D 3/00
[52] U.S. Cl. ...................... 360/133; 369/291; 403/408.1
[58] Field of Search ................................ 360/133, 135; 369/291; 403/280, 360, 405.1, 406.1, 408.1

[56] References Cited

U.S. PATENT DOCUMENTS

| | | | |
|---|---|---|---|
| 4,470,083 | 9/1984 | Doering et al. | 360/133 |
| 4,797,764 | 1/1989 | Doering | 360/131 |
| 4,846,374 | 7/1989 | Gabrys | 403/408.1 |
| 4,897,134 | 1/1990 | Doering | 360/135 |
| 5,241,451 | 8/1993 | Walburn et al. | 403/408.1 |
| 5,288,162 | 2/1994 | Bisping et al. | 403/408.1 |
| 5,333,965 | 8/1994 | Mailey | 403/406.1 |
| 5,362,172 | 11/1994 | Hubbling | 369/291 |
| 5,535,080 | 7/1996 | Inoue et al. | 360/129 |
| 5,537,281 | 7/1996 | Ma et al. | 360/133 |
| 5,570,252 | 10/1996 | Summer et al. | 369/291 |

*Primary Examiner*—Jefferson Evans
*Attorney, Agent, or Firm*—Sughrue, Mion, Zinn, Macpeak & Seas, PLLC

[57] ABSTRACT

A magnetic disk cartridge has a cassette shell made of first and second cassette shell halves formed with pairs of holes for insertion of rivets. The rivets include a flange, elastically deformable bulged portions having tapered surfaces at their distal ends and sloped provisional retaining surfaces at their proximal ends. The cassette shell halves are provisionally assembled by inserting the rivets into the insertion holes from the side of the first cassette shell half to bring the sloped provisional retaining surfaces into engagement with sloped engagement surfaces in the rivet insertion holes of the second cassette shell half. The provisionally assembled cassette shell halves can be easily disassembled if necessary.

2 Claims, 5 Drawing Sheets

MAGNETIC DISK CARTRIDGE PROVISIONALLY ASSEMBLED UTILIZING AT LEAST ONE RIVET

BACKGROUND OF THE INVENTION

1. Field of the Invention

The present invention relates to a magnetic disk cartridge, more particularly to an improved provisional assembly structure for the cassette shell halves of a magnetic disk cartridge having a rotatable magnetic disk encased in a cassette shell constituted by mating and joining a pair of cassette shell halves.

2. Description of the Related Art

A magnetic disk cartridge comprises a magnetic disk for magnetically recording analog and/or digital signals rotatably encased in a thin cassette shell. The cassette shell is formed in the shape of a flat prism with a rectangular top surface slightly larger than the magnetic disk, a bottom surface having an opening through which a center core supporting the center of the magnetic disk is exposed and narrow side surfaces extending between the outer peripheral edges of the top and bottom surfaces. The magnetic disk cartridge is provided with a magnetic head access opening for insertion/withdrawal of magnetic heads used for magnetic recording and reproducing so as to enable the magnetic heads to be brought into contact with, or close to, the opposite surfaces of the magnetic disk from the exterior. The magnetic head access opening is equipped with a shutter for preventing invasion of dust and the like when the magnetic disk cartridge is not in use. Liners made of nonwoven fabric or the like are attached to the inner surfaces of the cassette shell opposite the main surfaces of the magnetic disk for protecting the surfaces of the magnetic disk from scratching as well as for wiping off dust and the like adhering thereto.

The space inside the cassette shell of the conventional magnetic disk cartridge is fairly large in the direction of magnetic disk thickness and the liners are accommodated in the spaces remaining above and below magnetic disk. Each liner is urged away from the inner surface of the cassette shell and maintained in contact with the corresponding surface of the magnetic disk by a weak plate spring called a lifter. Owing to this arrangement, a certain degree of tolerance is available regarding the dimensional precision of the cassette shell in the thickness direction.

In recent years, new high-density recording methods have led to the development of a magnetic disk cartridge with 50 times the capacity of the widely used conventional magnetic disk cartridge (3.5-inch floppy disk). The magnetic disk of this type of magnetic disk cartridge is rotated at a much faster speed than the conventional one and the magnetic heads used for recording and reproducing signals to/from the magnetic disk are required to be positioned with very high precision.

A quality inspection is conducted as the final step in the assembly of magnetic disk cartridges and a cartridge found to be defective is removed from the line as a reject. Various types of defects may occur. When the defect is in the magnetic disk, not the cassette shell halves, it is preferable for the cassette shell halves to be reusable since they are precision molded and therefore expensive to produce.

The magnetic disk cartridge comprises a pair of mated and joined cassette shell halves and the magnetic disk is encased by the cassette shell halves to be rotatable therein. Thus if the quality inspection is conducted before the cassette shell halves encasing the magnetic disk are permanently joined by ultrasonic welding or the like in the final assembly step, a magnetic disk found to be defective can be replaced and the cassette shell halves be reused.

It is therefore preferable to adopt a structure which, in the final assembly step, allows the cassette shell halves to be provisionally assembled after the magnetic disk has been accommodated therein and the quality inspection to be conducted before permanent assembly by welding or the like so that the cassette shell halves can be readily disassembled if the magnetic disk is defective.

Although a provisional assembly structure employing screw fastening has been adopted in conventional audio and video cassettes, screw fastening limits the number of reuses possible because the tapped holes receiving the screws wear with repeated screw fastening. In addition, the screw fastening and screw removal operations are inefficient because each screw has to be turned independently with a screwdriver.

A method of provisionally assembling the cassette shell halves by inserting engaging pins provided on one cassette shell half into engaging holes provided in the other was therefore proposed. Since this method requires a certain amount of play to be established between the engagement pins and the engagement holes, however, some of the resulting provisionally assembled cassette shells turn out to have a loose fit between the cassette shell halves. A thorough quality inspection of a provisionally assembled magnetic disk cartridge with looseness between the cassette shell halves has been found to be impossible owing to the difficulty of rotating its disk at a high speed.

SUMMARY OF THE INVENTION

This invention was accomplished in light of the foregoing and has as its object to provide a magnetic disk cartridge having a provisional assembly structure which, in the final assembly step, enables the upper and lower cassette shell halves to be provisionally assembled easily and without looseness after the magnetic disk has been accommodated therein and enables the cassette shell halves to be readily disassembled when the magnetic disk is found to be defective.

For achieving this object, the invention provides a magnetic disk cartridge comprising a cassette shell made of first and second cassette shell halves formed on inner surfaces thereof with at least one pair of abutting surfaces that are in abutment during provisional assembly of the cassette shell halves and formed with at least one pair of rivet insertion holes that open at the abutting surfaces and are in alignment during provisional assembly and at least one rivet for provisionally assembling the first and second cassette shell halves by insertion into the insertion holes from the side of the first cassette shell half, the rivet including a flange at a base end thereof, and a stem extending from the flange and having a tip portion divided into multiple elastically deformable engagement segments terminating in bulged portions formed with tapered surfaces at their distal ends and with sloped provisional retaining surfaces at their proximal ends, the inner wall of the aligned rivet insertion holes being formed with an inwardly protruding small-diameter portion permitting passage of the bulged portions during rivet insertion by elastically reducing the outer diameter of the bulged portions when the tapered surfaces thereof are forced onto the small-diameter portion and a portion of the inner wall in the second cassette shell is formed with a sloped engagement surface enabling the sloped provisional retaining surfaces of the bulged portions to engage elastically therewith after the bulged portions have passed by the small-diameter portion and the outer diameter of the bulged portions has elastically expanded to near its original size, the cassette shell being provisionally assembled by inserting the rivet from the rivet insertion hole of the first cassette shell half into the rivet insertion hole of the second cassette shell half to bring the flange into abutment with a portion of the first cassette shell half, the sloped provisional retaining surfaces of the bulged portions of the rivet into engagement with the sloped engagement surface of the second cassette shell half, and the abutting surfaces into abutment with each other.

In a preferred embodiment of the magnetic disk cartridge, the entrance of the rivet insertion hole of the first cassette shell half is formed with a countersunk surface for seating the flange of the rivet and the opening of the rivet insertion hole at the outer surface of the second cassette shell half is enlarged to a size capable of accommodating the tip portion of the rivet when it is expanded by crushing, fusing or the like during permanent assembly.

DESCRIPTION OF THE PREFERRED EMBODIMENT

The magnetic disk cartridge of the present invention will hereinbelow be described with reference to the accompanying drawings.

Figure 1:
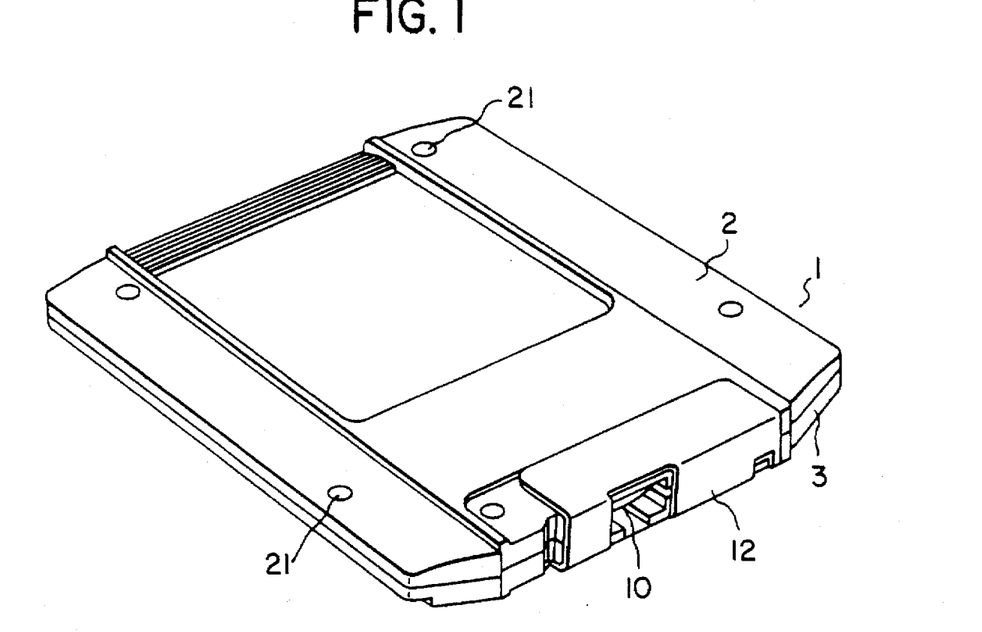
FIG. 1 is a top perspective view showing the overall configuration of a magnetic disk cartridge according to the invention.
Figure 2:
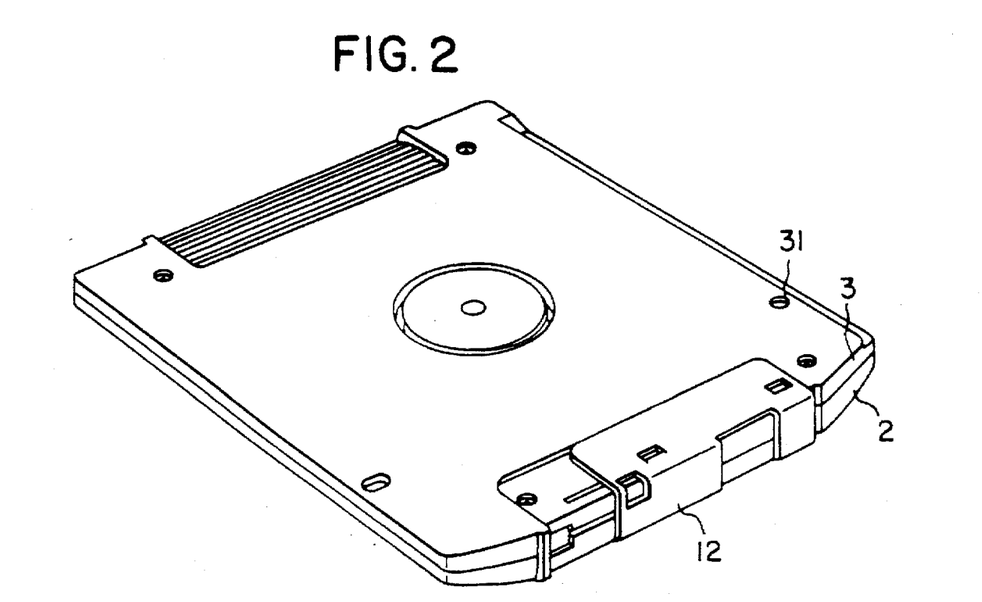
FIG. 2 is a bottom perspective view showing the overall configuration of a magnetic disk cartridge according to the invention.

FIGS. 1 and 2 show the overall configuration of a magnetic disk cartridge according to the invention. As shown in FIG. 1, the magnetic disk cartridge comprises a pair of upper (first) and lower (second) cassette shell halves 2, 3 mated and joined to form a cassette shell 1 encasing a magnetic disk to be rotatable therein. One side surface of the cassette shell 1 is formed with a magnetic head access opening 10 and this side of the cassette shell 1 is fitted with a slidable shutter 12 for opening and closing the magnetic head access opening. The shutter 12, which is biased in the closing direction, is shown in the open position in FIG. 1 and the closed position in FIG. 2.

Figure 3:
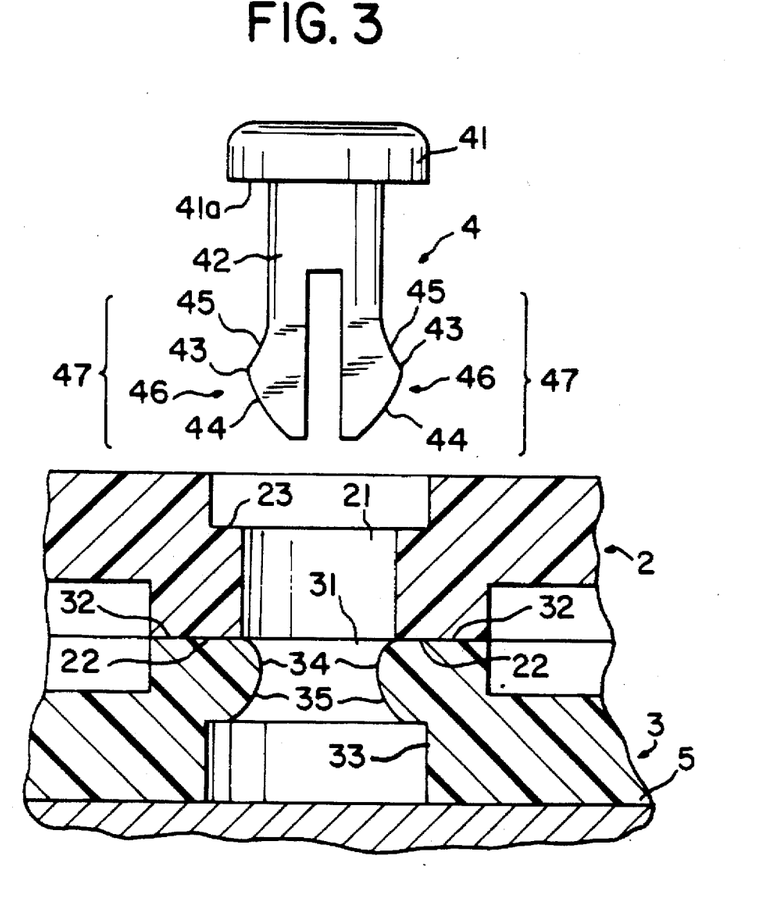
FIG. 3 is an enlarged sectional view of a rivetfastening portion of a magnetic disk cartridge which is an embodiment of the invention shown together with a rivet at the start of provisional assembly.

FIG. 3 is an enlarged sectional view of a rivetfastening portion of an invention magnetic disk cartridge, shown together with a rivet, at the start of provisional assembly.

The cassette shell halves 2, 3 are made of a hard resin such as impact-resistant polystyrene or ABS resin and are formed on their inner surfaces with abutting surfaces 22, 32 which are in abutment during provisional assembly. The abutting surfaces 22, 32 are formed with rivet insertion holes 21, 31. In the provisionally assembled state, the two holes are aligned and a rivet 4 is inserted therein.

Figure 4A:
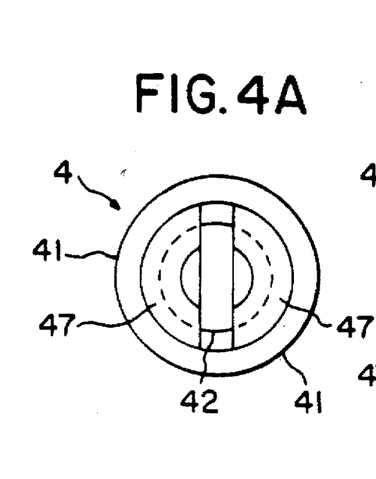
FIG. 4a and 4b are bottom views of a rivet used for the provisional assembly.
Figure 4B:
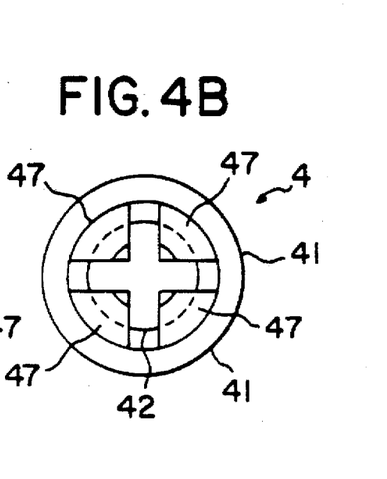

The rivet 4 for provisionally assembling the cassette shell halves 2, 3 is made of thermoplastic resin. The base of the rivet 4 (at the top in the figure) comprises a flange 41 having an undersurface 41a, a stem 42 extending from the flange 41, and laterally protruding bulged portions 46, 46 at the tip (bottom) of the stem 42. The bulged portions 46, 46 are formed with tapered surfaces 44, 44 at their distal ends and with sloped provisional retaining surfaces 45, 45 extending from their maximum diameter portions 43, 43 toward the flange 41. Thus each has the overall sectional shape of an outwardly protruding arc. As shown in the bottom views of FIG. 4(A) and 4(B), all but a portion of the stem 42 near the flange 41 is axially split into two or four sections constituting a pair or two pairs of engagement segments 47, 47 (47, 47) that are elastically deformable in directions perpendicular to the axis of the rivet 4.

The upper (first) cassette shell half 2 on the side from which the rivet 4 is inserted is formed at the entrance to the rivet insertion hole 21, i.e., at the upper end of the rivet insertion hole 21, with an annular countersunk surface 23 for seating the undersurface 41a of the flange 41 of the rivet 4. The countersunk surface 23 is formed to a depth such that the upper surface of the flange 41 does not project above the upper surface of the upper cassette shell half 2 when the flange 41 of the rivet 4 is seated thereon.

Figure 5:
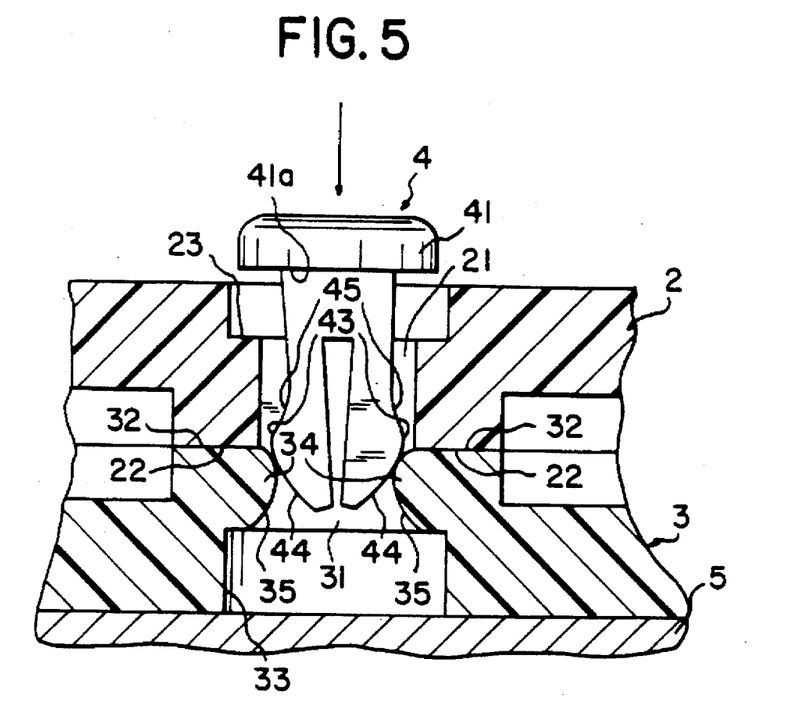
FIG. 5 is an enlarged sectional view similar to FIG. 3 showing insertion of the rivet.

The lower (second) cassette shell half 3, which is mounted on a jig 5 at the time of provisional assembly, is formed at the lower portion of the rivet insertion hole 31 with a large-diameter hole 33 of about the same diameter as the countersunk surface 23. The inner wall between the upper end of the rivet insertion hole 31 and the largediameter hole 33 is formed with an inwardly protruding minimum diameter portion 34 which continues into a sloped engagement surface 35 on the side of the large-diameter hole 33. The inner wall thus has the overall sectional shape of an inwardly protruding arc. As shown in FIG. 5, when the stem 42 of the rivet 4 is inserted into the rivet insertion hole 31 from above (by a rivet insertion tool not shown in the figure), the tapered surfaces 44, 44 of the bulged portions 46, 46 formed on the engagement segments 47, 47 of the rivet 4 strike against the minimum diameter portion 34. The minimum diameter portion 34 is formed to enable passage of the maximum diameter portions 43, 43 when the outer diameter of the maximum diameter portions 43, 43 is reduced owing to elastic compression of the engagement segments 47, 47 caused by forcing the tapered surfaces 44, 44 onto the minimum diameter portion 34. The sloped engagement surface 35 is formed to enable the sloped provisional retaining surfaces 45, 45 of the engagement segments 47, 47 to engage elastically therewith after the maximum diameter portions 43, 43 of the engagement segments 47, 47 have passed by the minimum diameter portion 34 of the rivet insertion hole 31 and the engagement segments 47, 47 have expanded to near their original size.

The sectional shape of the inner wall between the upper end of the rivet insertion hole 31 and the largediameter hole 33 is not particularly limited to that of an inwardly protruding arc as described in the foregoing. For example, it can instead can be formed in the sectional shape of an inwardly protruding triangle with its apex at the minimum diameter portion 34, i.e., with the sloped surface above the minimum diameter portion 34 and the sloped engagement surface 35 on the side of the largediameter hole 33 both being made flat, or can be formed in the sectional shape of a trapezoid with a flat minimum diameter portion 34. The shape of the bulged portions 46, 46 of the rivet 4 can also be modified from that described in the foregoing. For example, the bulged portions 46, 46 can each be formed in the sectional shape of an outwardly protruding triangle with its apex at the maximum diameter portion 43, i.e., with the tapered surface 44 and the sloped provisional retaining surface 45 both being made flat. In addition, the minimum diameter portion 34 need not be provided entirely within the rivet insertion hole 31 of the lower cassette shell half 3 but can instead be provided at portions of the rivet insertion hole 21 and the rivet insertion hole 31 bridging the boundary between the two cassette shell halves 2, 3.

Figure 6:
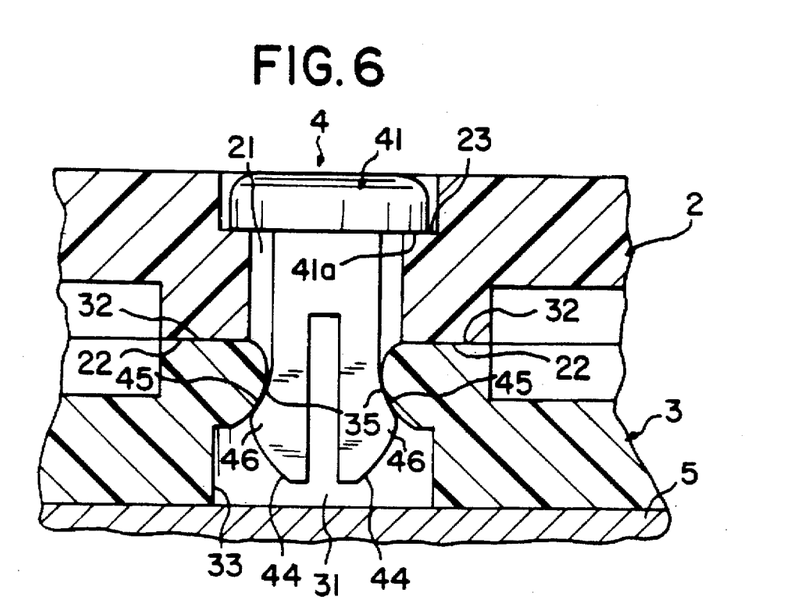
FIG. 6 is an enlarged sectional view similar to FIG. 3 showing the provisionally assembled state.

FIG. 6 shows the cassette shell halves 2, 3 after completion of the provisional assembly by the rivet 4. In the provisionally assembled state, the undersurface 41a of the flange 41 of the rivet 4 is seated on the countersunk surface 23 of the upper cassette shell half 2 and the sloped provisional retaining surfaces 45, 45 of the engagement segments 47, 47 of the rivet 4 are elastically engaged with the sloped engagement surface 35 of the lower cassette shell half 3. As a result, the elastic force of the engagement segments 47, 47 of the rivet 4 squeezes the upper and lower cassette shell halves 2, 3 onto each other, thereby provisionally assembling the cassette shell 1 precisely to the prescribed thickness with no looseness between the cassette shell halves. Since the sloped provisional retaining surfaces 45, 45 of the rivet 4 have outwardly protruding arcuate shapes as viewed in a section parallel to the engagement direction, their engagement with the sloped engagement surface 35 of the lower cassette shell half 3 enables the rivet 4 to produce a strong engaging force between the cassette shell halves 2, 3. The cassette shell halves 2, 3 are thus safe from separation under ordinary forces acting thereon.

Figure 7:
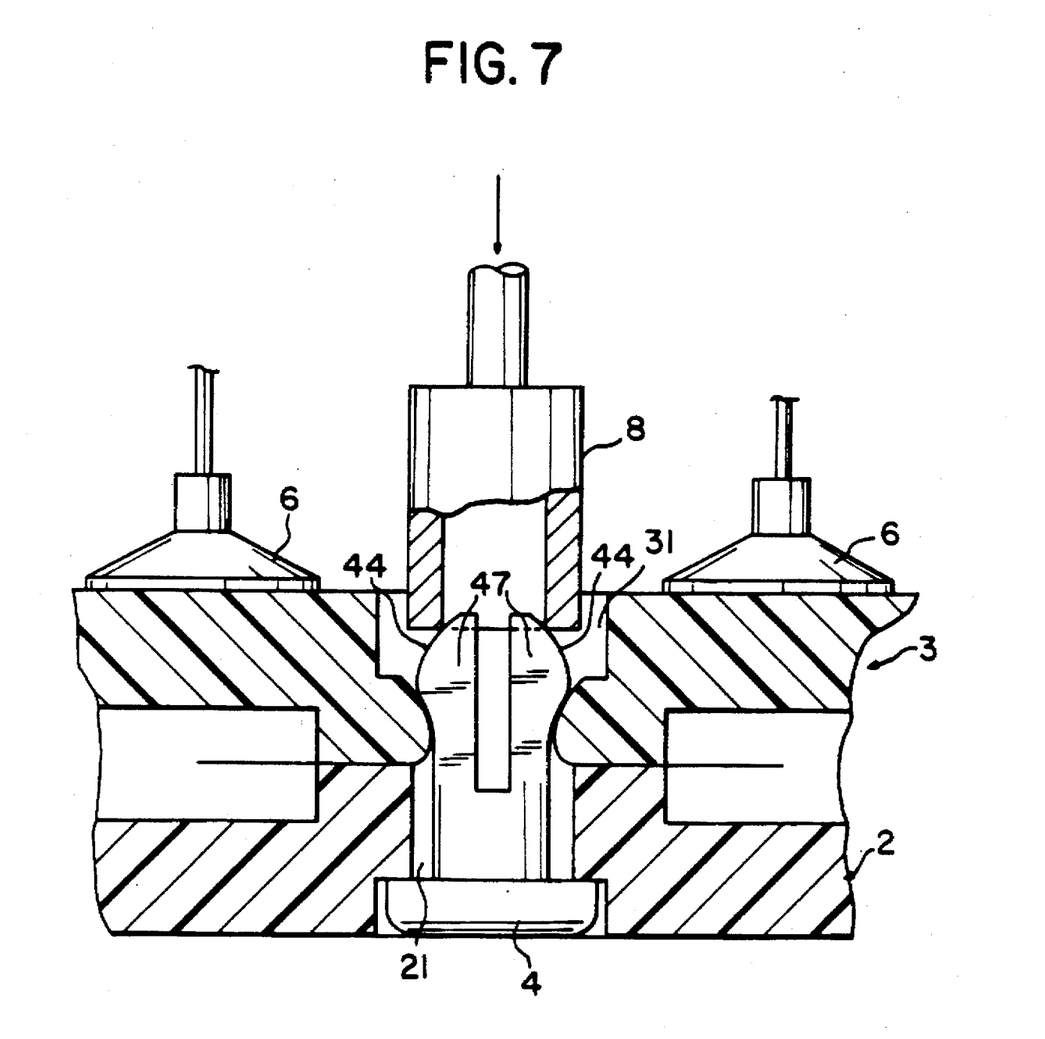
FIG. 7 is an enlarged sectional view of the rivet-fastening portion of the magnetic disk cartridge of FIG. 1 showing disassembly from the provisional assembled state.

If the magnetic disk encased by the provisionally assembled cassette shell 1 is found to be defective in the quality inspection, the provisionally assembled cassette shell 1 can be disassembled to allow its replacement. As shown in FIG. 7, the disassembly of the cassette shell 1 is achieved by turning provisionally assembled cassette shell halves 2, 3 upside down, holding the cassette shell half 3 now on the upper side with one or more suction cups 6 or the like, pressing down on the tapered surfaces 44, 44 of the bulged portions 46, 46 of the rivet 4 with, for example, a tubular tool 8 having an inner diameter that is smaller than the inner diameter of the minimum diameter portion 34 of the rivet insertion hole 31 of the lower cassette shell half 3 so that the inner surface of the tool 8 elastically bends the tips of the engagement segments 47, 47 inward and reduces the outer diameter of the maximum diameter portions 43, 43 of the engagement segments 47, 47 to no larger than the inner diameter of the minimum diameter portion 34. As the tool 8 moves further downward, the rivet 4 and the cassette shell half 2 fall free of the cassette shell half 3. The magnetic disk can then be removed from the separated cassette shell halves 2, 3, while the separated cassette shell halves 2, 3 can be reused.

Figure 8:
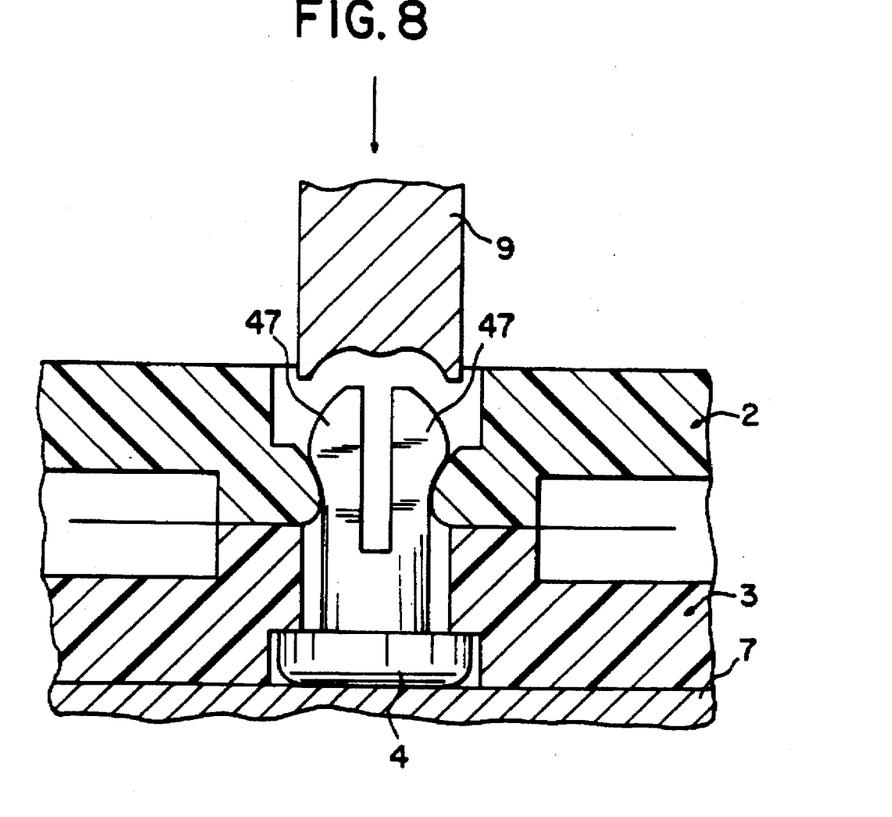
FIG. 8 is an enlarged sectional view of the rivet-fastening portion of the magnetic disk cartridge of FIG. 1 showing the start of permanent assembly after provisional assembly.
Figure 9:
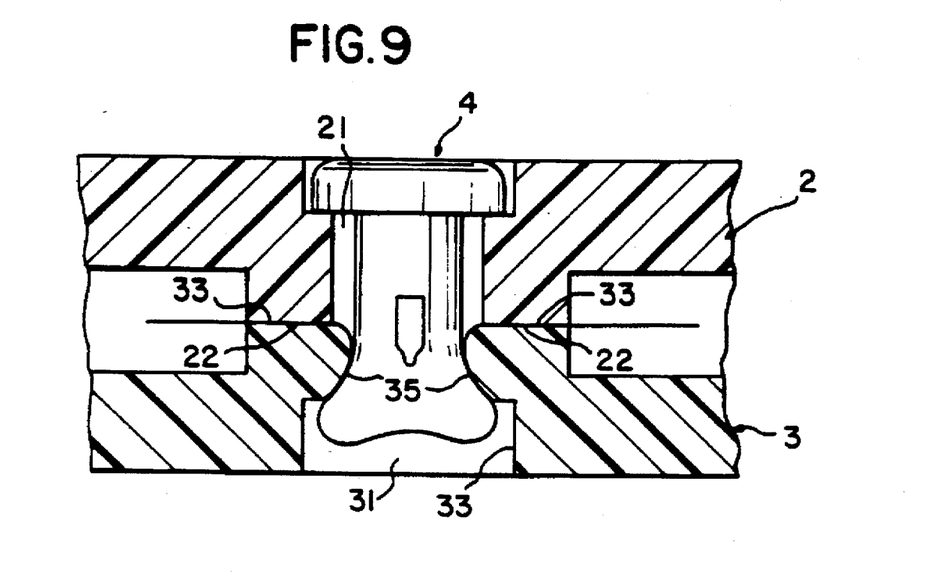
FIG. 9 is an enlarged sectional view of the rivet-fastening portion of the magnetic disk cartridge of FIG. 1 showing the permanently assembled state.

If no defect is discovered in the quality inspection of the provisionally assembled magnetic disk cartridge, the cassette shell 1 is permanently assembled. As shown in FIG. 8, this is achieved by turning the provisionally assembled cassette shell halves 2, 3 upside down on a jig 7 used for permanent assembly, inserting a tool 9 into the largediameter hole 33 of the rivet insertion hole 31 and crushing the tips of the engagement segments 47, 47 exposed in the large-diameter hole 33 in the state shown in FIG. 6. As a result, as shown in FIG. 9, the crushed engagement segments 47, 47 produce a strong engagement force with a region extending from the sloped engagement surface 35 to the large-diameter hole 33 and inseparably fix the cassette shell halves 2, 3 together.

Other methods can also be used for fixing the engagement segments 47, 47 to the sloped engagement surface 35. For example, it is possible to heat and fuse them in the large-diameter hole 33 or to secure the sloped provisional retaining surfaces 45, 45 of the bulged portions 46, 46 of the engagement segments 47, 47 to the sloped engagement surface 35 by ultrasonic welding.

The magnetic disk cartridge according to this invention has first and second cassette shell halves formed on their inner surfaces with abutting surfaces which come into abutment when the cassette shell is provisionally assembled and with at least one pair of alignable holes for insertion of a rivet. The rivet comprises a flange, a stem whose tip portion is split into at least two engagement sediments, and laterally protruding bulged portions at the tips of the engagement segments. The bulged portions are formed with tapered surfaces at their distal ends and with sloped provisional retaining surfaces at their proximal ends. The first cassette shell half from which the rivet is inserted is formed at the entrance to the rivet insertion hole with a countersunk surface or the like for seating the flange of the rivet. The inner wall of the aligned rivet insertion holes is formed in the direction of rivet insertion with an inwardly protruding small-diameter portion and an ensuing sloped engagement surface continuous therewith. When the rivet is inserted into the rivet insertion holes, the tapered surfaces of bulged portions strike against the small-diameter portion and the outer diameter of bulged portions is compressed elastically to a size enabling their passage through the small-diameter portion of the rivet insertion holes. After the bulged portions of the rivet have passed through the small-diameter portion, they elastically expand to near their original size, thereby bringing the sloped provisional retaining surfaces of the bulged portions into elastic engagement with the sloped engagement surface of the rivet insertion holes. Since the sloped engagement surface is formed in the second cassette shell half, the cassette shell of the magnetic disk cartridge can thus be provisionally assembled simply by inserting the rivet into the aligned rivet insertion holes of the first and second cassette shell halves. This is because the sloped provisional retaining surfaces of the rivet inserted from the side of the first cassette shell half engage with the sloped engagement surface of the second cassette shell half and the elasticity of the rivet operates to force the cassette shell halves onto each other. This ensures the prescribed thickness of the provisionally assembled cassette shell to a high degree of accuracy.

Since the cassette shell halves are held together by the strong clamping force of the rivet, no looseness is present in the provisionally assembled cassette shell. While the cassette shell halves are therefore safe from separation under ordinary forces acting thereon, they can be easily separated by using an appropriate tool to elastically press the tips of the engagement segments inward. If the magnetic disk encased by the provisionally assembled cassette shell is found to be defective in the quality inspection, the provisionally assembled cassette shell can be disassembled to allow its removal, whereafter the cassette shell halves can be reused. If the magnetic disk cartridge passes the quality test in the provisionally assembled state, it can then be permanently assembled simply by crushing or fusing the tips of the engagement segments exposed at the end of the rivet insertion hole of the second cassette shell half.

When the countersunk surface for seating the rivet flange is formed at the entrance of the rivet insertion hole of the first cassette shell half and the opening of the rivet insertion hole at the outer surface of the second cassette shell half is enlarged to a size capable of accommodating the tip portion of the rivet when it is expanded or crushed at the time of permanent assembly, projection of the flange and tip portion from the outer surfaces of the cassette shell can be prevented.

What is claimed is:

1. A magnetic disk cartridge comprising a magnetic disk, a cassette shell encasing the magnetic disk to be rotatable therein and formed by mating and joining first and second cassette shell halves formed on inner surfaces thereof with at least one pair of abutting surfaces that are in abutment during provisional assembly of the cassette shell halves and formed with at least one pair of rivet insertion holes that open at the abutting surfaces and are in alignment during provisional assembly, at least one rivet for provisionally assembling the first and second cassette shell halves by insertion into the insertion holes from the side of the first cassette shell half, the rivet including a flange at a base end thereof, and a stem extending from the flange and having a tip portion divided into multiple elastically deformable engagement segments terminating in bulged portions formed with tapered surfaces at their distal ends and with sloped provisional retaining surfaces at their proximal ends, wherein an inner wall of the aligned rivet insertion holes is formed with an inwardly protruding small-diameter portion permitting passage of the bulged portions during rivet insertion by elastically reducing the outer diameter of the bulged portions when the tapered surfaces thereof are forced onto the small-diameter portion and a portion of the inner wall in the second cassette shell is formed with a sloped engagement surface enabling the sloped provisional retaining surfaces of the bulged portions to engage elastically therewith after the bulged portions have passed by the small-diameter portion and the outer diameter of the bulged portions has elastically expanded to near its original size, and the cassette shell being provisionally assembled by inserting the rivet from the rivet insertion hole of the first cassette shell half into the rivet insertion hole of the second cassette shell half to bring the flange into abutment with a portion of the first cassette shell half, the sloped provisional retaining surfaces of the bulged portions of the rivet into engagement with the sloped engagement surface of the second cassette shell half, and the abutting surfaces into abutment with each other.

2. A magnetic disk cartridge as defined in claim 1, wherein an entrance of the rivet insertion hole of the first cassette shell half is formed with a countersunk surface for seating the flange of the rivet and an opening of the rivet insertion hole at the outer surface of the second cassette shell half is enlarged to a size capable of accommodating the tip portion of the rivet when it is expanded during permanent assembly.

* * * * *

UNITED STATES PATENT AND TRADEMARK OFFICE
CERTIFICATE OF CORRECTION

PATENT NO.    : 5,682,286
DATED         : October 28, 1997
INVENTOR(S)   : MIZUTA It is certified that error(s) appears in the above-identified patent and that said Letters Patent is hereby corrected as shown below:

Title page, item [73]
In the Assignee section, change "Tomega" to --Iomega--.

Signed and Sealed this

Tenth Day of February, 1998

Attest:

Attesting Officer

BRUCE LEHMAN

Commissioner of Patents and Trademarks